US006822949B1

(12) United States Patent
Noh

(10) Patent No.: US 6,822,949 B1
(45) Date of Patent: Nov. 23, 2004

(54) REGISTER CONTROL APPARATUS FOR W-CDMA WLL SEPARATION TYPE TERMINAL

(75) Inventor: Sang-Young Noh, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/532,952

(22) Filed: Mar. 22, 2000

(30) Foreign Application Priority Data

Sep. 30, 1999 (KR) .......................... 1999/42145

(51) Int. Cl.[7] .............................................. H04J 13/00
(52) U.S. Cl. ..................................... 370/335; 370/342
(58) Field of Search ................................ 370/320, 335, 370/342

(56) References Cited

U.S. PATENT DOCUMENTS 6,715,022 B1 * 3/2004 Ahern ........................ 710/314

OTHER PUBLICATIONS

PM6341 E1XC E1 Framer/Transceiver Data Sheet Issue 8: Jun. 1998, by: PMC–Sierra, Inc.*

* cited by examiner

Primary Examiner—Melvin Marcelo
(74) Attorney, Agent, or Firm—Fleshner & Kim, LLP

(57) ABSTRACT

A register control apparatus is provided between a master unit and a slave unit for a W-CDMA WLL separation type terminal which includes a mirror register of a master unit, a register of a slave unit, a framing logic unit for periodically transmitting data to and extracting data from the master unit and the slave unit through a time slot, and a transmission path for connecting the master unit and the slave unit.

21 Claims, 1 Drawing Sheet

REGISTER CONTROL APPARATUS FOR W-CDMA WLL SEPARATION TYPE TERMINAL

BACKGROUND OF THE INVENTION

1. Field of the Invention

The present invention relates to a wireless communication system, and more particularly to a register control apparatus for a separation type terminal in a wireless communication system.

2. Background of the Related Art

FIG. 1 is a block diagram illustrating a CDMA basic type terminal of the background technology. As shown therein, the background W-CDMA basic type terminal includes a microprocessor 11 for controlling operation of a system, a decoding logic unit 12 for decoding a control instruction of the microprocessor 11 and interpreting the decoded instruction signal, and a register 13 for storing data.

The above-described W-CDMA basic type terminal (decoding module 20) includes the decoding logic unit 12 and the register 13 in a module. In addition, there are further provided a modem module, a subscriber interface module, an RF module, etc., which are not shown in FIG. 1.

Multiple modules 20 controlled by the microprocessor 11 are connected by a bus and are controlled by a chip select signal, a read signal and a write signal, which are control signals from the microprocessor 11.

The microprocessor 11 reads data stored in the register 13 of each module 20, checks the state of each module 20, writes data used for the next operation into the module register 13, and instructs the next operation of the module.

In the above-described operation, an address bus, a data bus, a chip select signal (CS), a write signal (WR) for writing data into a register, and a read signal (RD) for reading data from the register are used.

In the read operation, the microprocessor 11 generates an RD signal to the module 20 for reading data, and a particular module 20 is selected in accordance with the CS signal. An address which will be read from among the addresses of the register 13 appears at the address bus, and the data read from the register appears at the data bus. At the same time, the data which appears at the data bus is read based on the generated RD signal.

In the write operation, the microprocessor 11 generates a WR signal to the module 20 for writing the data, and the module 20 is selected in accordance with the CS signal. An address which will be written among the addresses of the register 13 appears at the address bus, and the data which will be stored in the register 13 appears at the data bus. The data which appears at the data bus is written into the designated register.

However, in the background method, when the master unit and the slave unit are distanced by a few meters or hundreds of meters like the W-CDMA WLL separation type terminal, the above-described construction results in series problems such as: (1) it is impossible to transmit the address bus, data bus, CS signal, RD signal, and WR signal; and (2) when a new protocol is adapted between the master unit and the slave unit, a new microprocessor is needed in the slave unit for processing the protocol. In addition, in both cases the design of the system must be changed due to the decreased compatibilities with the software.

SUMMARY OF THE INVENTION

An object of the invention is to solve at least the above problems and/or disadvantages and to provide at least the advantages described hereinafter.

Accordingly, it is an object of the present invention to provide a register control apparatus between a master unit and a slave unit for a W-CDMA WLL separation type terminal which is capable of controlling two remote terminals by providing a transmission path between the master unit and the slave unit and sharing data between registers.

To achieve the above object and other objects, there is provided a register control apparatus between a master unit and a slave unit for a W-CDMA WLL separation type terminal which includes a mirror register of a master unit, a register of a slave unit, a framing logic unit for periodically transmitting and extracting data by the master unit and the slave unit through a time slot, and a transmission path for connecting the master unit and the slave unit.

To achieve further objects of the invention, there is provided a method of controlling a slave unit in a separation type terminal in a W-CDMA WLL system wherein data is transmitted between the master unit and the slave unit such that data contained in the master unit is the same as data contained in the slave unit, the slave unit is located remotely from the master unit, and the slave unit is controlled by the master unit based on data stored in the master unit and received from the slave unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
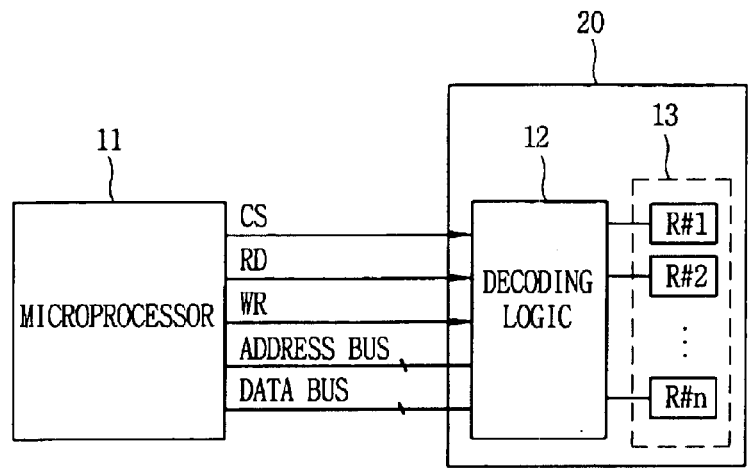
FIG. 1 is a block diagram illustrating a background W-CDMA WLL basic terminal.
Figure 2:
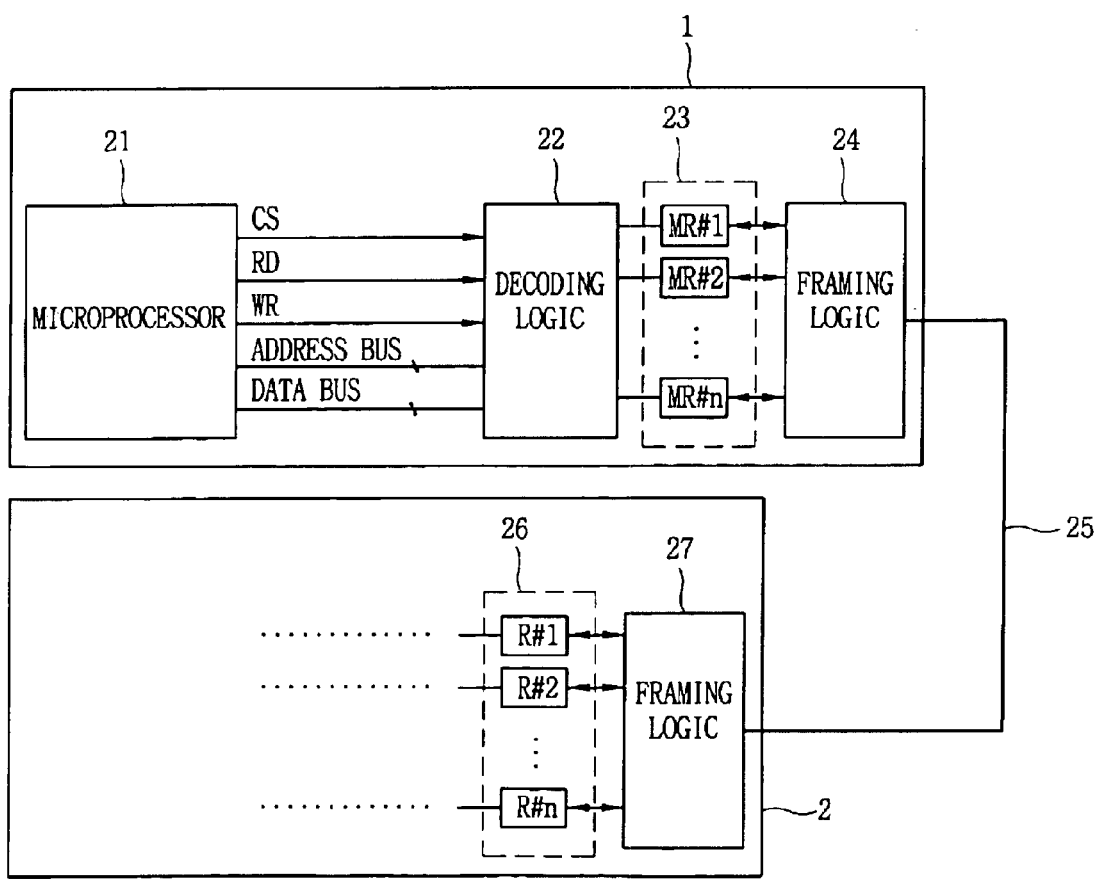
FIG. 2 is a block diagram illustrating a register control apparatus between a master unit and a slave unit for a W-CDMA WLL according to the present invention.

FIG. 2 is a block diagram illustrating an example of a register control apparatus between a master unit 1 and a slave unit 2 for a W-CDMA WLL separation type terminal according to a preferred embodiment of the present invention. As shown therein, the register control apparatus includes a master unit 1, a slave unit 2, and a transmission path 25 connecting the master unit 1 and the slave unit 2.

The master unit 1 includes a microprocessor 21 for controlling the operations of the W-CDMA WLL separation type terminal, a decoding logic unit 22 for decoding control instructions of the microprocessor 21 and interpreting the decoded instruction signal, and a plurality of mirror registers 23 for storing the control instruction of the microprocessor 21 inputted through the decoding logic unit 22 and storing data of the slave unit 2. Also included in master unit 1 is a framing logic unit 24 for periodically transmitting the control instructions of the microprocessor 21 stored in the mirror registers 23 to the slave unit 2 through the transmission path 25 based on a time slot, receiving data of the slave unit 2 inputted through the transmission path 25, extracting the received data and storing the extracted data into the mirror registers 23.

The slave unit 2 includes a plurality of slave registers 26 for storing data and instructing the next instruction, and a framing logic unit 27 for periodically transmitting the data stored in the slave registers 26 to the master unit 1 through the transmission path 25 based on a time slot of the framing logic unit 27, receiving the contents of a mirror register 23 of the master unit 1 and storing the data extracted from the slave registers 26. The operation of slave unit 2 is controlled by the microprocessor 21. Namely, the slave unit 2 operates when the microprocessor 21 writes data into the slave registers 26.

Since the master unit and slave unit are remotely distanced, the transmission path 25 is used for periodically transmitting and receiving the data therebetween. The periodic transmission between the master unit and the slave unit through the allocated time slot is implemented by the framing logic units 24 and 27. The data of the mirror register 23 and the slave register 26 are changed during the above-described process, and the updated data is transmitted therebetween to maintain the same data state in both mirror register 23 and slave register 26.

In the write operation, the microprocessor 21 of the master unit 1 does not directly access the slave register 26 of the slave unit 2, but instead accesses the mirror register 23.

When data is written by the microprocessor 21 into a designated address of the mirror register 23, various buses of the microprocessor 21 write the data into the mirror registers 23 in a manner similar to the background method discussed above.

However, in the present invention, the data written in the mirror register 23 is periodically transmitted to the slave unit 2 through the time slot of the framing logic unit 24. The transmitted data is extracted by the framing logic unit 27 of the slave unit 2 and is written into each slave register 26. The slave unit 2 operates based on the data written in the slave registers 26.

In the read operation, the data of the slave register 26 is periodically transmitted to the master unit 1 through an allocated time slot. In the master unit, the data is extracted from the time slot and is written into each mirror register 23. The microprocessor 21 of the master unit 1 reads the address stored in the mirror register 23 during the read operation in the same manner that the data written in a corresponding slave register 26 is read.

In the present invention, the transmission path 25 between the master unit 1 and the slave unit 2 can be implemented based on an E1(2.048 Mbps) link. The states of the mirror registers 23 and the slave registers 26 are periodically transmitted to the corresponding opponents. Namely, in the case that the data of the slave register 26 of the slave unit 2 or the data of the mirror register 23 of the master unit 1 is changed, the changed contents are transmitted between the master unit 1 and the slave unit 2 at a period of 125 □sec. In this way, the data of the mirror register 23 of the master unit 1 and the slave register 26 of the slave unit 2 are updated. The master unit 1 and the slave unit 2 of the W-CDMA WLL terminals periodically transmit and receive the data through the transmission path 25, extract the transmitted and received data, and store the data in a corresponding register. The master unit 1 then accesses the mirror register 23 instead of the slave register 26 for controlling the slave unit 2.

In addition, the microprocessor 21 of the master unit accesses only the mirror register 23 through the bus, and the slave unit uses only the corresponding slave register 26. Even when two apparatuses are separated from each other, since the microprocessor accesses the mirror register existing at the same address, it is not necessary to change the address map and the protocol. In addition, complete design changes are not needed based on the hardware and software. As the amount of the data is increased, the capacity of the transmission path is increased for compatibility.

As described above, in the present invention, when control of the W-CDMA WLL separation type terminal and two remote apparatuses is needed, the control is implemented through a certain transmission path.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A control apparatus for a separation type terminal having a master unit and a slave unit in a W-CDMA WLL system, the control apparatus comprising:

a mirror register local to the master unit and containing a mirror register data;

a slave register local to the slave unit and containing a slave register data; and a transmission path, wherein data is transmitted between the mirror register and the slave register through the transmission path so that the mirror register and the slave register data are the same.

2. The apparatus of claim 1, wherein the mirror register data and the slave register data are periodically transmitted and received.

3. The apparatus of claim 1, wherein the mirror register and the slave register are the same in type and capacity.

4. The apparatus of claim 1, further comprising:

a master controller local to the master unit and containing a master framing unit; and a slave controller local to the slave unit and containing a slave framing unit, wherein the transmission path connects the master controller to the slave controller and is a link obtained based on the amount of data processed by the slave controller.

5. The apparatus of claim 1, further comprising:

a master frame logic unit local to the master unit;

a slave frame logic unit local to the slave unit, wherein the data transmission and receiving operations between the mirror register and the slave register are performed periodically through a time slot allocated by the master and slave frame logic units.

6. A control apparatus for a separation type terminal in a W-CDMA WLL system, comprising:

a master unit having a mirror register;

a slave unit having a slave register and controlled by the master unit; and a transmission path for implementing a data transmission and receiving operation between the master unit and the slave unit.

7. The apparatus of claim 6, wherein the master unit comprises:
  a microprocessor for controlling the W-CDMA WLL terminal;
  a decoding logic unit for interpreting a control instruction of the microprocessor; and
  a framing logic unit for transmitting data to and receiving data from the mirror register and the slave unit and storing the received data in the slave register.

8. The apparatus of claim 6, wherein the slave unit comprises:
  a plurality of slave registers for storing data of the slave unit and storing data transmitted from the master unit; and
  a framing logic unit for transmitting and receiving data between the mirror register and the slave unit, and for storing in one of the plurality of slave registers next operation data, state data of the slave unit, and received data.

9. The apparatus of claim 7, wherein the mirror register is formed of a register having a same capacity and type as the slave register.

10. The apparatus of claim 7, wherein the framing logic unit adjusts a frame synchronization of the master unit and the slave unit when transmitting the data using a certain clock signal as a sampling clock signal.

11. The apparatus of claim 7, wherein the framing logic unit periodically transmits a data of the mirror register to a framing logic unit of the slave unit through an allocated time slot.

12. The apparatus of claim 7, wherein the framing logic unit periodically receives slave register data through an allocated time slot and stores it in the mirror register.

13. The apparatus of claim 7, wherein the mirror register receives slave register data at a certain period and stores the same.

14. The apparatus of claim 8, wherein the framing logic unit periodically transmits slave register data to a framing logic unit of the master unit through an allocated time slot.

15. The apparatus of claim 8, wherein the framing logic unit periodically receives mirror register data through an allocated time slot and stores it in the slave register.

16. The apparatus of claim 7, wherein the framing logic unit periodically performs a data transmission through a framing logic unit of the slave unit and the transmission path.

17. The apparatus of claim 8, wherein the framing logic unit periodically performs a data transmitting and receiving operation through a framing unit of the master unit and the transmission path.

18. The apparatus of claim 6, wherein the transmission path is a transmission link formed based on the amount of data processed by the slave unit and has a connection structure between the slave unit and the master unit.

19. The apparatus of claim 6, wherein the mirror register contains data that is the same as data contained by the slave register, and the master unit uses the mirror register to control the slave unit.

20. A method of controlling a slave unit in a separation type terminal in a W-CDMA WLL system, the method comprising:
  transmitting data between a master unit and the slave unit such that data contained in the master unit is a duplicate of data contained in the slave unit, the slave unit being located remotely from the master unit; and
  controlling the slave unit with the master unit based on data stored in the master unit and received from the slave unit.

21. The method of claim 20, wherein the data is periodically transmitted and received by the master unit and the slave unit.

* * * * *